(12) United States Patent
Han et al.

(10) Patent No.: US 10,248,723 B2
(45) Date of Patent: Apr. 2, 2019

(54) METHOD AND DEVICE FOR GENERATING FINGERPRINTS OF INFORMATION SIGNALS

(71) Applicant: Teletrax B.V.

(72) Inventors: Jungong Han, Eindhoven (NL); Gerrit Cornelis Langelaar, Eindhoven (NL)

(73) Assignee: Teletrax B. V., Eindhoven (NL)

( * ) Notice: Subject to any disclaimer, the term of this patent is extended or adjusted under 35 U.S.C. 154(b) by 14 days.

(21) Appl. No.: 15/301,554

(22) PCT Filed: Apr. 2, 2015

(86) PCT No.: PCT/NL2015/050211
§ 371 (c)(1),
(2) Date: Oct. 3, 2016

(87) PCT Pub. No.: WO2015/152719
PCT Pub. Date: Oct. 8, 2015

(65) Prior Publication Data
US 2018/0018394 A1    Jan. 18, 2018

(30) Foreign Application Priority Data

Apr. 4, 2014 (NL) ..................................... 2012567

(51) Int. Cl.
*G06K 9/00* (2006.01)
*G06F 17/30* (2006.01)
(Continued)

(52) U.S. Cl.
CPC .. *G06F 17/30743* (2013.01); *G06F 17/30814* (2013.01); *G06K 9/00744* (2013.01); *G10L 25/18* (2013.01); *G10L 25/54* (2013.01)

(58) Field of Classification Search
CPC ......... G06F 17/30743; G06F 17/30814; G10L 25/18; G10L 25/54; G06K 9/00744
See application file for complete search history.

(56) References Cited

U.S. PATENT DOCUMENTS 7,516,074 B2   4/2009 Bilobrov
8,140,331 B2   3/2012 Lou
(Continued)

FOREIGN PATENT DOCUMENTS

WO    WO 02/065782 A1    8/2002
WO    WO2003/067466 A2   8/2003
WO    WO 2004/040475 A2  5/2004

OTHER PUBLICATIONS

"Transform Coding of Audio Signals Using Perceptual Noise Criteria", IEEE Journal on Selected Areas in Communications, vol. 6, No. 2, Feb. 1988.

*Primary Examiner* — Andrew C Flanders
(74) *Attorney, Agent, or Firm* — Woodard, Emhardt, Henry, Reeves & Wagner, LLP

(57) ABSTRACT

Method and system for generating a fingerprint representing a portion of an information signal. The method comprises decomposing a portion of the information signal into plural frequency sub bands at a decomposition level, calculating a spectral property of the signal in each of said plural frequency sub bands, comparing each spectral property against a first criterion thereby generating a comparison result, combining each comparison result for constituting the fingerprint, at least once repeating the decomposing, calculating, comparing and combining, wherein for each repetition the decomposing is performed using a decomposition level different from a previous decomposition level.

14 Claims, 3 Drawing Sheets

(51) Int. Cl.
    *G10L 25/18*    (2013.01)
    *G10L 25/54*    (2013.01)

(56) References Cited

U.S. PATENT DOCUMENTS

| | | |
|---|---|---|
| 8,204,314 B2 | 6/2012 | Lu et al. |
| 8,340,449 B1 | 12/2012 | Yagnik et al. |
| 8,380,518 B2 | 2/2013 | Kim et al. |
| 8,440,900 B2 | 5/2013 | Lyon et al. |
| 8,492,633 B2 | 7/2013 | Whitman et al. |
| 2006/0020958 A1* | 1/2006 | Allamanche ............ G10L 25/48 725/19 |
| 2009/0052784 A1* | 2/2009 | Covell .............. G06F 17/30784 382/209 |
| 2013/0060365 A1* | 3/2013 | Jeong ..................... G10L 19/20 700/94 |
| 2013/0139674 A1* | 6/2013 | Whitman ................ G10H 1/00 84/609 |
| 2013/0287214 A1* | 10/2013 | Resch ................ G10H 1/0008 381/56 |
| 2014/0019390 A1* | 1/2014 | Glennon ................ G06N 5/02 706/12 |
| 2015/0279381 A1* | 10/2015 | Goesnar ............... G10L 19/018 704/500 |

* cited by examiner

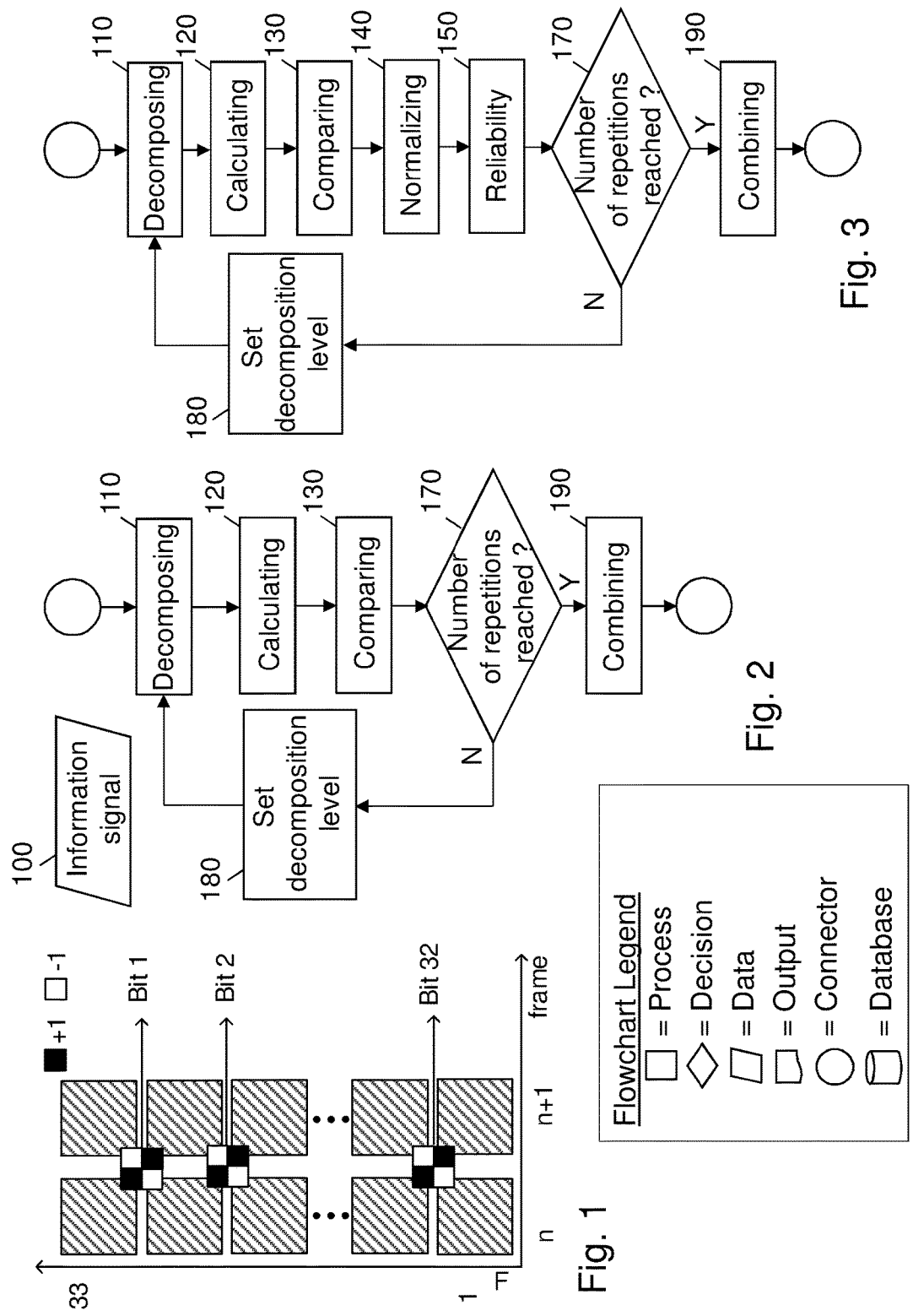

METHOD AND DEVICE FOR GENERATING FINGERPRINTS OF INFORMATION SIGNALS

FIELD OF THE INVENTION

The invention relates to a method of generating a fingerprint representing a portion of an information signal, and to a corresponding device, computer program and various uses of same.

BACKGROUND OF THE INVENTION

With movies, television, music and other audio and video being almost ubiquitous in today's society, there is a growing desire to be able to identify such content automatically. Automatically identifying content opens various possibilities, such as acquiring metadata such as title, artist, genre, lyrics, reviews, ratings and so on for such content, or providing additional content or activities to accompany the content. Another attractive application is broadcast monitoring: identifying broadcasts and compiling lists for use in e.g. determining royalty payouts to copyright holders.

One technique for obtaining an identifier for content is called fingerprinting, sometimes also referred to as signature creation, robust fingerprinting, robust hashing or feature extraction. A (robust) fingerprint of a content item is a representation of the most relevant perceptual features of the item.

Generally speaking, fingerprinting algorithms have two performance criteria: discrimination and robustness. A discriminative fingerprinting algorithm allows differentiating two information signals from each other. That is, it should be statistically unlikely to get two similar fingerprints from two dissimilar signals. A robust fingerprinting algorithm allows for identifying the same information signal with various distortions. That is, the fingerprints computed from two distorted versions of the same signal should be the same or at least very similar to each other. Distortions may be accidental or intentional: from low-quality radio broadcasts of music to cropping or resizing of movies or the adding of subtitles, overlays or watermarks.

Many schemes for identification and classification of information signals using fingerprinting have been proposed. Some examples are disclosed in U.S. Pat. Nos. 8,140,331B2, 8,380,518B2, 7,516,074B2, 8,440,900B2 and 8,492,633B2.

U.S. Pat. No. 8,204,314 discloses a method of generating a spatial signature or fingerprint for a frame of a video object. The frame is divided into plural blocks. For each block the mean luminance is calculated, and the relative ordering of blocks by luminance is transformed into a vector that is one of multiple inputs for the spatial signature or fingerprint. This process is performed at multiple levels by creating a more fine-grained division of blocks: first 2×2 blocks, then 4×4 blocks, and so on. A disadvantage of this method is that comparing all mean luminances against each other to create a relative ordering is slow. In addition, there is significant correlation between blocks, which reduces the robustness of the algorithm.

U.S. Pat. No. 8,340,449 discloses a method of calculating fingerprints for videos based on their spatial and sequential characteristics. Pairs of adjacent pixels form the lowest-level values. Sums or differences or pairs are taken as a higher-level value. This process is repeated for each row, column, and time column in the video segment. The result is a three-dimensional array of coefficients that represents the spatial and sequential characteristics of all frames in the segment, which array is subsequently quantized, for example by comparing the magnitude of each coefficient to a predetermined threshold value. This flattens the array to a one-dimensional bit vector. In an example each bit is quantized to +1, −1, or 0 and a two-bit encoding scheme uses the bits 10 for +1, 01 for −1, and 00 for zero. The bit vector forms the fingerprint.

A disadvantage of this method is that computed frequency differences are correlated, which means the resulting fingerprints are not fully discriminative. Further, the calculation process is slow because of the complex calculations involved.

International patent application WO 02/065782 by Haitsma et al. discloses a method of generating a robust hash identifying an information signal comprising audio or audio-visual content such as a movie, television program or song. The method divides the information signal into frames, computes a hash word for each frame, and concatenates successive hash words to constitute the hash signal. Computing the hash word comprises subdividing each frame of the information signal into plural frequency sub bands, calculating a spectral property of the signal in each of said frequency sub bands, comparing the properties in the frequency sub bands with respective thresholds and representing the results of said comparisons by respective bits of the hash word.

FIG. 1 illustrates an embodiment of the Haitsma algorithm employing a 33×N spectrogram image with 33 frequency sub bands F on the y-axis and N frames on the x-axis. A 32 bits fingerprint is extracted at each frame based on a filtering technique. The energy difference between subsequent frames in time and subsequent frequency sub bands in frequency is computed and compared with a threshold. A "1" bit corresponds to a positive difference value while a "0" bit to a non-positive value. If we denote the energy of frequency band m at frame n as E(n,m), and the m-th bit of the fingerprint of frame n by B(n,m), the bits of a fingerprint can be expressed with the following formula:

$$F(n,m) = E(n,m) + E(n-1,m) - E(n,m+1) - E(n-1,m)$$

$$B(n,m) = \begin{cases} 1, & F(n,m) > 0 \\ 0, & F(n,m) \le 0 \end{cases}$$

In this way, a 32-bit fingerprint can be generated from 33 frequency sub bands for each frame. The Haitsma disclosure combines 256 of these frame fingerprints into a block fingerprint, and performs a search based on this block fingerprint.

A disadvantage of the Haitsma algorithm is that the computed frequency differences are correlated, thus the resulting fingerprints are not fully discriminative. Even when it is assumed that the input frequency sub bands are uncorrected, the filtering (difference operation) introduces some correlation between filtered values.

Further, in the Haitsma algorithm, the difference between individual frequency sub bands is susceptible to small changes that impact one or more frequency sub bands. In general, differences computed from larger frequency ranges (e.g. over multiple frequency sub bands) are more robust against noise introduced by audio or video processing.

SUMMARY OF THE INVENTION

The invention provides an improved method of generating a fingerprint representing an information signal, which provides a more discriminative fingerprint compared to Haitsma. The method comprises the steps of decomposing a portion of the information signal into plural frequency sub bands at a decomposition level, calculating a spectral property of the signal in each of said plural frequency sub bands, comparing each spectral property against a first criterion thereby generating a comparison result, combining each comparison result for constituting the fingerprint, at least once repeating the decomposing, calculating, comparing and combining, wherein for each repetition the decomposing is performed using a decomposition level different from a previous decomposition level.

The criterion commonly is a threshold, for example zero or an absolute value to be compared against. The threshold preferably is a spectral property value of a neighboring band or the spectral property value of a corresponding band in a previous portion. The spectral property may be the energy of a frequency band or the tonality of a frequency band. For video signals, the mean luminance of a band may constitute the spectral property of said band. The frequency sub bands preferably are frequency sub bands of the frequency spectrum of the respective portion of the information signal. The frequency sub bands may have an increasing bandwidth as a function of the frequency. Combining can be as simple as concatenating in order, but a reordering could be of interest, e.g. high-reliable first. The portion can be a frame of the information signal.

In an embodiment of the invention, each repetition in the decomposing is performed using a decomposition level coarser than the previous decomposition level. Coarser means that the subdivision in frequency sub bands at a decomposition level has a lower number of sub bands than a previous decomposition level. At a lowest or finest decomposition level, the process is similar to the one used by Haitsma et al., obtaining certain fingerprint bits. At the coarser decomposition level, new frequency sub bands are created and associated lo create higher-level fingerprint bits.

In an embodiment, for each repetition the decomposing comprises creating plural frequency sub bands by combining frequency sub bands of the previous decomposition level. This higher-level step produces a lower number of frequency sub bands compared lo the previous decomposition level. However, each of these frequency sub bands represents a larger frequency band. Larger frequency sub bands used at coarser decomposition levels are inherently more robust as the noise energy is diluted over a larger frequency band. Hence, the resulting fingerprint is more robust.

In a further preferred embodiment, the combining comprises using successive pairs of frequency sub bands of the previous decomposition level, such that half the number of frequency sub bands are created compared to the number of frequency sub bands in the previous decomposition level.

To improve the discriminative power of the method, instead of computing the differences between overlapping pairs of frequency sub bands, one may compute only the differences between non-overlapping pairs of frequency sub bands. This prevents inclusion of correlated differences. In this way, the redundancy between features is somewhat removed, resulting in a more discriminative feature representation.

The comparing in subsequent repetitions may use the same criterion for comparing, however in an embodiment, for each repetition the comparing is performed using a criterion different from a previous criterion.

In a further embodiment the calculating further comprises calculating a difference between the spectral property and the criterion, the difference being indicative of a reliability of each comparisons result in the comparing. A comparison result is unreliable when it is a low-quality match against the criterion, for example it is close to the threshold value.

Preferably as part of this further embodiment a step is included of normalizing the spectral property of the signal in each band as part of the step of calculating said spectral property. This embodiment allows for ranking fingerprint comparison results across levels in terms of reliability. Having the comparison results represented by bits for example, during the fingerprint computation, it is possible to identify the least reliable bits (e.g. 8 bits out of 32). In the search process, one or more of these low-reliability comparison results are changed when no match is obtained Because comparison results of multiple levels are used, it is hard to compare low-quality comparison results of one level against low-quality comparison results of another level. By applying normalization to the spectral property before comparing, the quality of comparison results at the various levels can be compared.

Preferably further as part of this further embodiment a step is included of applying a weight factor to properties during normalization at decomposition levels other than the finest decomposition level. The inventors have found that comparison results at a coarser decomposition level tend to be more reliable than comparison results at a finer decomposition level. Applying normalization as in the previous claim ignores this knowledge, meaning a comparison result at a coarser decomposition level could be seen as less reliable than it actually is. Applying the weight factor compensates for this.

The method of generating a fingerprint according to the invention can be used advantageously in a method of matching the fingerprint against one or more reference fingerprints.

In an embodiment, one or more comparison results of the generated fingerprint having an associated indicator with relatively low reliability are changed when no match is obtained. In an alternative embodiment, one or more comparison results of the generated fingerprint having an associated indicator with relatively low reliability are ignored.

The above described method can be performed by a specially adapted device for generating a fingerprint representing an information signal. The device comprises decomposition means for decomposing the portion of the information signal into plural frequency sub bands at a decomposition level, calculation means for calculating a spectral property of the portion for each of the plural frequency sub bands, comparison means for comparing each spectral property against a criterion, combining means for combining each comparison result for constituting the fingerprint. The device has repetition means arranged for at least once repeating the decomposing, calculating, comparing and combining respectively, wherein the decomposition means is arranged for performing the decomposing using a decomposition level different from a previous decomposition level.

Such a device may be comprised into device for rendering content, such as a television, radio, tablet or mobile phone. Alternatively the device may be used in other devices, e.g. for broadcast monitoring, audio or video recognition or other information signal processing.

The invention further provides for a computer-readable storage medium comprising executable instructions, which, when executed on a computer cause the computer perfrom the steps of the above described method according to the invention. This causes the computer to operate as the device of the invention.

BRIEF DESCRIPTION OF THE FIGURES

The invention will now be explained in more detail with reference to the figures, in which:

FIG. 1 illustrates an embodiment of the Haitsma algorithm;

FIG. 2 schematically illustrates the method of the invention;

FIG. 3 schematically illustrates an improvement to the method of the invention;

In the figures, same reference numbers indicate same or similar features. In cases where plural identical features, objects or items are shown, reference numerals are provided only for a representative sample so as to not affect clarity of the figures.

DETAILED DESCRIPTION OF CERTAIN EMBODIMENTS

Figure 4:
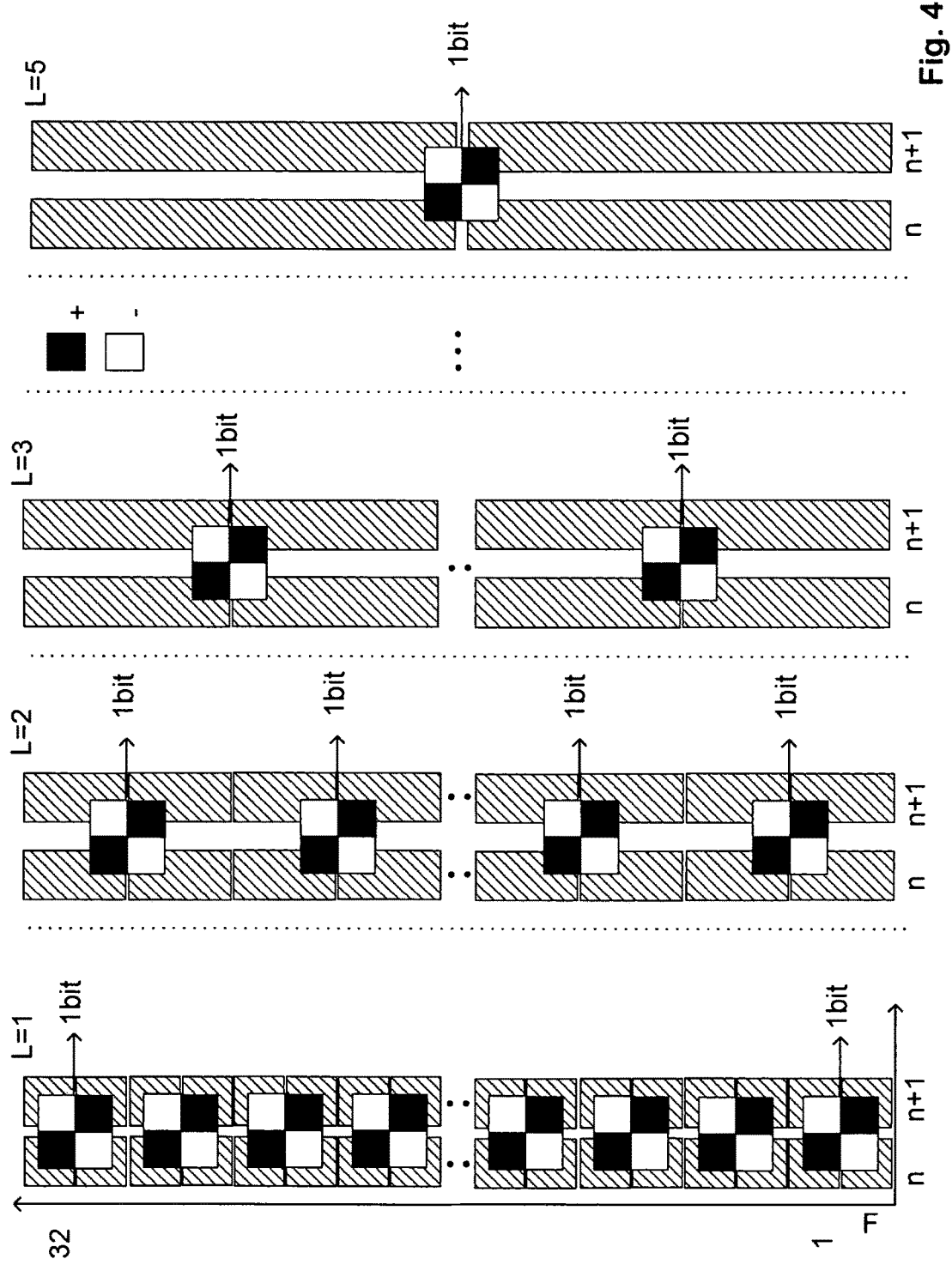
FIG. 4 schematically illustrates the underlying algorithm in more detail.

FIG. 2 schematically illustrates the method of the invention. An information signal 100 is received for which a fingerprint is needed. This fingerprint may be used e.g. for the purpose of obtaining metadata regarding the information signal 100, or for triggering an action such as logging the event or blocking the information signal 100 or any of many other options known in the art (or thought of in the future) regarding information signals.

The information signal 100 is received in portions. A portion can be a frame, a plurality of concatenated frames or another subdivision of the content, wherein each frame may represent a few seconds of the audio or video signal, or a block of video. Some systems may work with only the fingerprint representing said frame, other systems need fingerprints of plural frames to be concatenated before further action can be taken. For example, in systems that obtain metadata regarding the information signal 100, fingerprints for frames equaling a few seconds of audio or video are often needed.

At step 110 the frame of the information signal 100 is decomposed into plural frequency sub bands 111*a*, . . . , 111*n* of a finest decomposition level.

In step 120 the method calculates a spectral property of the signal 100 in each of said frequency sub bands. This spectral property may be an energy of a frequency band or a tonality of a frequency band, where tonality can be represented by a tonality coefficient [1]. For video signals, the mean luminance of a band may constitute the spectral property of said band. The frequency sub bands preferably are frequency sub bands of the frequency spectrum of the respective frame of the information signal. The frequency sub bands may have an increasing bandwidth as a function of the frequency. Frequency sub bands may be overlapping but are preferably non-overlapping, to prevent inclusion of correlated differences. This results in a more discriminative feature representation.

In step 130 the method compares each spectral properly against a certain criterion and produces an output bit representative of each of the comparison results as respective bits corresponding to the finest decomposition level. The criterion commonly is a threshold, for example zero or an absolute value to be compared against. The threshold preferably is the spectral properly value such as an energy level of a neighboring band or the spectral property value of a corresponding band in a previous frame In one preferred embodiment the criterion used is whether the energy of the current frequency band is higher or lower than that of its neighbor. If higher, the result is 1; if lower the result is 0.

In step 170 the method is being repeated for a predetermined number of times so as to obtain a predetermined number of frequency sub bands at various decomposition levels and resulting bits at various levels. Preferably the predetermined number is 4, meaning the method is performed five times: once at the finest decomposition level and four times at successive coarser decomposition levels. This results in 32-bit hashes which are efficient to process with the current design in computer hardware (as compared to say, 24-bit or 72-bit hashes). Note that the criterion used in step 130 may be different at different levels.

If at step 170 it is determined that the predetermined number (N) is not reached, then first the frequency sub bands of the coarser decomposition level are created in step 180 by combining successive pairs of frequency sub bands at the finer decomposition level. Then in step 110 the frame is divided into plural frequency sub bands of a yet coarser decomposition level, in step 120 a spectral property of the signal in each of these higher-level frequency sub bands is calculated, in step 130 the comparison is made against the criterion and the results are again represented as respective bits of a yet coarser decomposition level.

If at step 170 it is determined that the predetermined number of repetitions is reached (Y), the method proceeds to step 190.

Finally, in step 190 the method combines the bits of all the levels to constitute the fingerprint for the frame. Combining can be as simple as concatenating in order, but a reordering could be of interest, e.g. high-reliable first.

In the above process the steps 110-130 are repeated until at step 170 it is determined that enough levels have been reached. This allows for an optional refinement where the calculated properties in each band at the finest decomposition level can easily be used to calculate higher-level properties Assuming higher-level frequency sub bands exactly overlap with consecutive lower-level frequency sub bands, as in FIG. 4, one can simply add up the properties at the lower-level frequency sub bands and arrive at the spectral property of the higher-level band Alternatively the steps 110-130 can be performed in parallel or consecutively for each desired decomposition level wherein the subdivision in frequency sub bands is different, causing the decomposition level to be different for each subdivision step.

FIG. 3 schematically illustrates a further improvement of the method shown in FIG. 2 in which reliability information is added. Steps equal to FIG. 2 are not discussed again.

The inputs of the comparing step 130 at each level are used in this improvement to generate information which is indicative of the reliability of each of the bits representing the results of the comparisons. A bit is unreliable when it is a low-quality match against the criterion, i.e. it is close to the threshold value. Matching a fingerprint with unreliable bits is less likely to result in a positive match with a reference fingerprint.

Preferably, first in step 140 the spectral property of the signal in each band is normalized. This embodiment allows for ranking fingerprint bits across levels in terms of reliability Because bits of multiple decomposition levels are used, it is hard to compare low-quality bits of one level against low-quality bits of another level. By applying normalization to the spectral property before comparing, the quality of bits at the various levels can be compared.

During the normalization process preferably a weight factor is applied to spectral properties during normalization at levels other than the finest decomposition level. The inventors have found that bits at a coarser decomposition level tend to be more reliable than bits at a finer decomposition level. Applying normalization ignores this knowledge, meaning a bit at a coarser decomposition level could be seen as less reliable than it actually is. Applying the weight factor compensates for this.

Next, in step 150 the actual reliability information is calculated. A given number (e.g. 8 out of 32) of the lowest-reliable bits are recorded, allowing one or more of these low-reliability bits to be changed when no match is obtained FIG. 4 schematically illustrates the algorithm underlying the method of FIG. 2, discussed below in the context of audio fingerprint extraction using frequency properties. The algorithm starts with a preprocessing step, including sample-rate conversation, stereo-to-mono conversation, audio signal framing, etc. Next, a band subdivision and energy computation are applied in the time-frequency domain after a typical FFT transform for the original signal By doing so, a 32×N spectrogram map is generated and fed into our fingerprint bit extraction module The energy of the frequency band m at frame n is denoted as E(n,m). The sub-band energy difference over time at the first decomposition level can be computed by:

$$\text{Delta}^1_E(n,m) = E(n+1,m) - E(n,m), m = 1, 2 \ldots 32$$

At the first decomposition level of the hierarchical structure shown in FIG. 4, the energy difference on the frequency direction is calculated. This is actually an energy subtraction procedure over neighboring frequency bands, which can be specified as:

$$F^1(n,k) = \text{Delta}^1_E(n, 2 \times k - 1) - \text{Delta}^1_E(n, 2 \times k), k = 1, 2 \ldots 16$$

The first 16 fingerprint bits at the lowest decomposition level can be obtained by looking at the sign of $F^1(n,k)$, which are formally defined as:

$$B^1(n,k) = \begin{cases} 1, & F^1(n,k) > 0 \\ 0, & F^1(n,k) \leq 0 \end{cases}$$

Prior to computing the fingerprint bits for the next higher decomposition level, we first sum up the energy of each pair of neighboring frequency bands using the following formula:

$$\text{Delta}^2_E(n,m) = w^2 \left( \text{Delta}^1_E(n, 2 \times m - 1) + \text{Delta}^1_E(n, 2 \times m) \right), m = 1, 2 \ldots 16.$$

Here, a weight factor w is included which is related to each decomposition level. This factor w can be used for normalization and weighting between different decomposition levels. In the above formula, $w^2$ refers to the weight factor at the second decomposition level in the process of the invention.

While F(n,m) is computed over same number of lowest decomposition level frequency sub bands at each decomposition level, across decomposition levels they are computed over different number of frequency sub bands. This poses a bias when all energy differences are sorted according to their magnitude. In particular, weak bits are chosen almost exclusively from the lowest decomposition level. The inventors have experimentally determined that this way of assignment does not represent a good strategy.

In an embodiment, one may apply a normalization factor to the weight factor w in order to normalize higher decomposition level band energies, thus the energy differences. Preferably this factor is 0.5. This allows for energy normalization and overcomes the challenge posed by the new extraction method.

Experiments reveal that normalization (while giving better accuracy than non-normalized case) does not necessarily yield the best assignment of weak bits. In a refinement of this embodiment, the weights are altered away from the normalization factor of 0.5. In particular, a weight of more than 0.5 was used in order to reflect the stability and robustness of the higher decomposition levels. In other words, the feature from the higher decomposition levels is more stable than that of the lower decomposition levels in the sense that it is unlikely to be distorted. Mapping it to the weak bit concept, it is logical that we define less weak bits in the higher decomposition levels, but assign more weak bits to the unreliable lower decomposition levels. In essence, the features are weighed differently based on their position in the hierarchy. We have found that this strategy results in a better weak bit assignment and improves the accuracy and efficiency of the search.

Next, the fingerprint bits are calculated through:

$$F^2(n,k) = \text{Delta}^2_E(n, 2 \times k - 1) - \text{Delta}^2_E(n, 2 \times k), k = 1, 2 \ldots 8$$

and $$B^2(n,k) = \begin{cases} 1, & F^2(n,k) > 0 \\ 0, & F^2(n,k) \leq 0 \end{cases}$$

These operations are repeated until the last bit at the fifth decomposition level is generated. Eventually, we put together bits computed from each decomposition level to form a 32 bit sub-fingerprint.

The description above uses a particular order of operations, i.e. differencing in time and recursive computation of frequency sub bands at different decomposition levels, in order to simplify the description. A person knowledgeable in the field would observe that the order of differencing between frequency sub bands and between time frames can be changed without impacting the result, or the high decomposition level differences can be computed directly by summing and subtracting corresponding parts of the spectrum independently from other decomposition levels.

Figure 5:
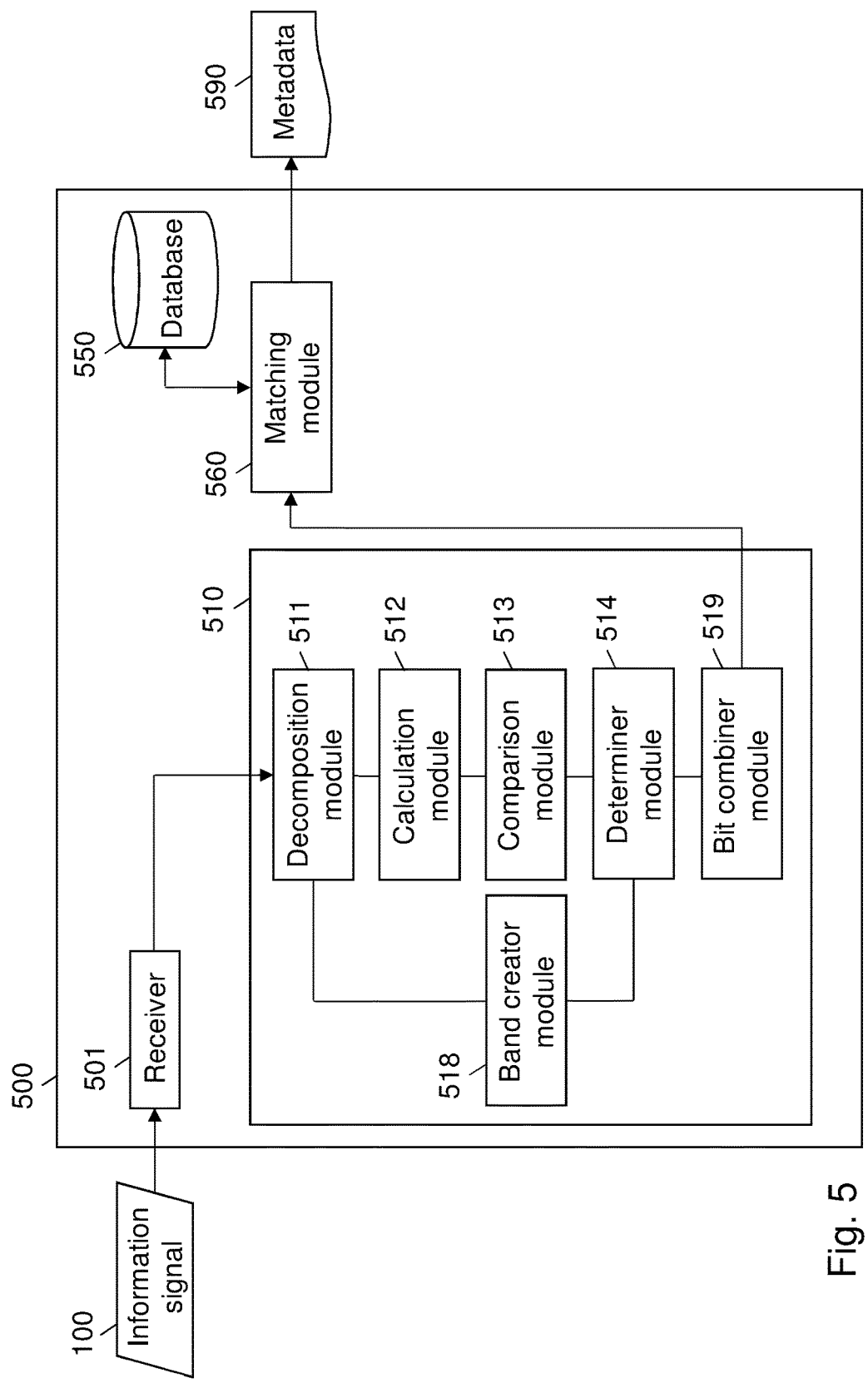
FIG. 5 schematically shows a device in accordance with the invention.

FIG. 5 schematically illustrates a device 500 for matching a fingerprint against one or more reference fingerprints present in a database 550. This database 550 is shown as internal to the device 500 for ease of explanation, but may also be present external to the device, e.g. accessible over a network such as the Internet. The device 500 incorporates a device 510 that performs the method of the present invention.

The device 500 preferably comprises a receiver 501 for receiving the information signal 100, which is fed to the device 510. This device comprises decomposition module 511, calculation module 512, comparison module 513, determiner module 517, band creator module 518 and bit combiner module 519, corresponding to steps 110, 120, 130, 170, 180 and 190 of FIG. 2 respectively. Modules for the extra steps of FIG. 3 can be added with ease. Module 514 has a counter which causes the decomposition, calculation, comparison, combining and determining to be repeated a required number of repetitions.

When the bit combiner module 519 has produced a fingerprint, this fingerprint is fed to matching module 560 where a search in database 550 is performed. The result, e.g. metadata 590 for the signal 100 is produced as an output.

As noted above, bits produced by the invention may have a relatively low reliability due to their closeness to the threshold or similar issue. In an embodiment this reliability issue is addressed by having the matching module 560 change one or more bits having an indicator of relatively low reliability when no match is obtained. The more bits of low reliability are changed, the longer the search time will be. Furthermore the chance of a false match increases with the number of bits that are changed. The inventors have found that changing ('flipping') 8 out of 32 bits provides a good compromise in practice between the desire for high reliability and the desire for short search times in database 550.

Alternatively the reliability issue can be addressed by simply ignoring one or more bits having an indicator of relatively low reliability when no match is obtained.

The above provides a description of several useful embodiments that serve to illustrate and describe the invention. The description is not intended to be an exhaustive description of all possible ways in which the invention can be implemented or used. The skilled person will be able to think of many modifications and variations that still rely on the essential features of the invention as presented in the claims. In addition, well-known methods, procedures, components, and circuits have not been described in detail.

The invention claimed is:

1. A method of generating a fingerprint representing an information signal, the method comprising the steps of:
    decomposing a portion of the information signal into plural frequency sub bands at a decomposition level;
    calculating a spectral property of the portion for each of the plural frequency sub bands;
    comparing each spectral property against a criterion, thereby generating a comparison result;
    combining each comparison result for constituting the fingerprint; and
    repeating, at least once, the decomposing, calculating, comparing and combining, wherein
    for each repetition the decomposing is performed using a decomposition level different from a previous decomposition level.

2. The method according to claim 1, wherein for each repetition the decomposing is performed using a decomposition level coarser than the previous decomposition level.

3. The method according to claim 2, wherein for each repetition the decomposing comprises creating plural frequency sub bands by combining frequency sub bands of the previous decomposition level.

4. The method according to claim 3, wherein the combining comprises using successive pairs of frequency sub bands of the previous decomposition level.

5. The method according to claim 1, wherein for each repetition the comparing is performed using a criterion different from a previous criterion.

6. The method according to claim 1, wherein the calculating further comprises calculating a difference between the spectral property and the criterion, the difference being indicative of a reliability of each comparisons result in the comparing.

7. The method according to claim 6, wherein calculating the spectral property further comprises normalizing the spectral property.

8. The method according to claim 7, wherein calculating the spectral property further comprises applying a weight factor to the normalized spectral property.

9. The method according to claim 1, and further comprising the step of:
    matching comparison results of the generated fingerprint with comparison results of at least one reference fingerprint.

10. The method according to claim 9, wherein one or more comparison results of the generated fingerprint having an associated indicator with relatively low reliability are changed when no match is obtained.

11. The method according claim 9, wherein one or more comparison results of the generated fingerprint having an associated indicator with relatively low reliability are ignored.

12. A computer implemented device arranged for generating a fingerprint representing an information signal, comprising:
    decomposition means adapted for decomposing the portion of the information signal into plural frequency sub bands at a decomposition level;
    calculation means adapted for calculating a spectral property of the portion for each of the plural frequency sub bands;
    comparison means adapted for comparing each spectral property against a criterion;
    combining means adapted for combining each comparison result for constituting the fingerprint; and
    repetition means adapted for at least once repeating the decomposing, calculating, comparing and combining respectively;
    wherein the decomposition means is adapted for performing the decomposing using a decomposition level different from a previous decomposition level.

13. A device according to claim 12 wherein said device is adapted for rendering content.

14. A computer-readable non-transitory storage medium comprising executable instructions which when executed on a computer cause the computer to perform the steps of the method according to claim 1.

* * * * *